United States Patent [19]

Puyplat

[11] 3,924,290
[45] Dec. 9, 1975

[54] CLEANING DEVICE E.G. FOR VEHICLE HEADLIGHT LENS

[75] Inventor: Olivier Puyplat, Paris, France

[73] Assignee: Cibie Projecteurs, Bobigny, France

[22] Filed: Jan. 25, 1974

[21] Appl. No.: 436,430

[30] Foreign Application Priority Data
Mar. 2, 1973   France ............................. 73.07481

[52] U.S. Cl. .......... 15/250.04; 15/250 A; 15/250.24
[51] Int. Cl.² ............................................ B60S 1/46
[58] Field of Search ................. 15/250.01–250.09, 250.21–250.26, 250.29

[56] References Cited
UNITED STATES PATENTS 2,173,021   9/1939   Longwell et al. ................. 15/250.04
2,336,007   12/1943   Fuller ................................ 15/250.04
2,835,916   5/1958   Mittag et al. ..................... 15/250.04
3,407,426   10/1968   Muller .............................. 15/250.04
3,795,936   3/1974   Lane et al. ........................ 15/250.24

Primary Examiner—Peter Feldman
Attorney, Agent, or Firm—Alan H. Levine

[57]   ABSTRACT

A vehicle headlight wiper mechanism includes a reciprocable wiper blade and a nozzle. The wiper blade is arranged to swing from side to side in order to ensure that it trails behind the nozzle in either direction of movement of the wiper.

2 Claims, 4 Drawing Figures

CLEANING DEVICE E.G. FOR VEHICLE HEADLIGHT LENS

BACKGROUND TO THE INVENTION

The present invention relates to cleaning devices for example for a vehicle headlight lens.

Demands for ever increasing safety on the road are creating a need for a device which enables a driver to clean the lenses of his headlights automatically while continuing to drive since layers of mud, dust, crushed insects etc. can seriously impair the efficient performance of the headlights.

It has been proposed to use a reciprocable wiper blade for this purpose and to mount at least one sprinkler on the blade to spray the lens as it is swept by the blade. A disadvantage of this known system is that the sprinkler can only spray the lens in one of its two directions of movement.

Accordingly it is the main object of the invention to provide a more efficient device in which the wiper blade is preceded by a spray of washing liquid in each direction of movement.

Specifically the invention provides that the wiper and nozzle are mounted for relative movement such that the wiper trails behind washing liquid dispensed by the nozzle in each direction of movement of the wiper.

BRIEF DESCRIPTION OF THE DRAWINGS

The invention may be carried into practice in various ways but two specific embodiments will now be described by way of example with reference to the accompanying drawings in which:

FIGS. 1 and 2 illustrate the front lens 10 of a headlight for example for a motor car. The headlight is provided with a cleaning device 12 adapted, at the will of the driver, to clean the front face 14 of the lens in order to rid it of mud and other dirt which would harm its satisfactory performance.

Figure 1:
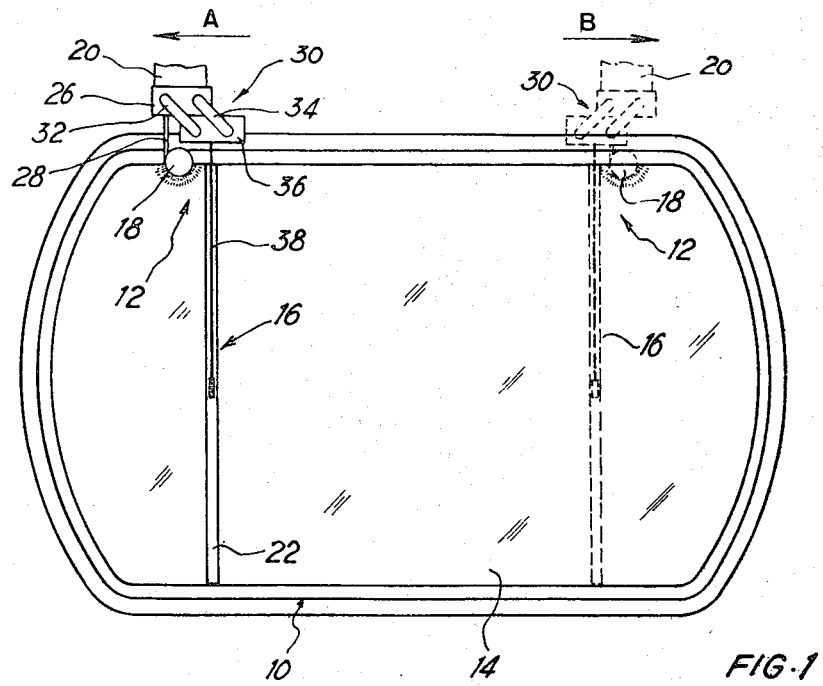
FIG. 1 is a diagrammatic front elevation of a vehicle headlight lens provided with a cleaning device in accordance with the present invention.

The cleaning device 12 includes at least one wiper 16 at least one sprinkler 18, and a drive element 20 which is connected to a suitable motor (not shown) which is adapted to reciprocate the drive element 20. In the specific construction shown in FIGS. 1 and 2 the reciprocating movement is linear as shown by the arrows A and B. It may alternatively be a rotary movement about a pivot which is fixed with respect to the headlight and the lens 10.

Figure 2:
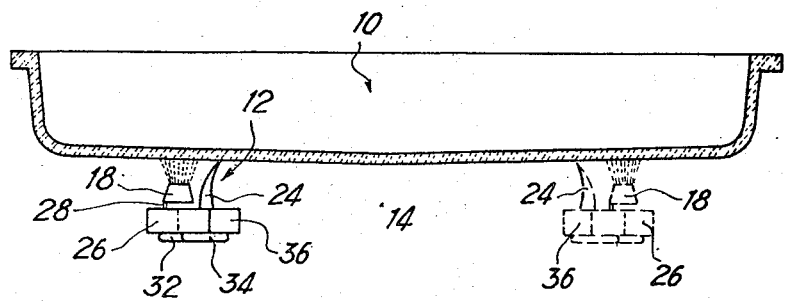
FIG. 2 is a plan view of FIG. 1.

In the embodiment shown in FIGS. 1 and 2 the wiper 16 includes a rigid fitting 24 and a squeegee 22, the fitting 24 being secured to a linkage rod 38 extending to a support 36 which in turn is mounted by means of two identical parallel links 32 and 34 on the end 26 of the drive element 20. The support 36 and the links 32 and 34 together provide a linkage between the drive element 20 and the squeegee which is capable of arcuate movement between the full line position shown on the left in FIG. 1 and the dotted line position shown on the right in FIG. 1. During such movement the linkage is capable of passing, with clearance, a rigid conduit 28 extending from the end 26 of the drive element to the sprinkler 18. The conduit 28 is connected by any suitable means, such as a flexible conduit, to a washing liquid source.

The links 32 and 34 are mounted for free pivotal movement at each end so that, as the drive element is reciprocated to and fro, the support 36 will be drawn in an arcuate manner between its extreme positions in each of which it abuts the end 26 of the drive element 20. This movement of the linkage is caused by drag between the squeegee 22 and the surface of the lens 14. Thus when the drive element 20 is moving in the direction of the arrow A in FIG. 1 the support 36, and hence the squeegee 22 are on the right hand side which is the trailing side of the sprinkler 18, whereas on a return movement in the direction of the arrow B the support 36 swings to the dotted line position shown on the left hand side of the sprinkler 18 so that the sprinkler again precedes the squeegee during its movement in a rightward direction. In either direction of movement therefore it is ensured that the sprinkler precedes the squeegee in order to wet the lens surface and assist considerably in the removal of dirt. The speed of movement of the squeegee is usually dependent on the frictional forces occurring between it and the surface of the lens but this does not of course affect the fact that the sprinkler will be positioned in front the squeegee very shortly after the movement of the driving element is reversed.

Figure 3:
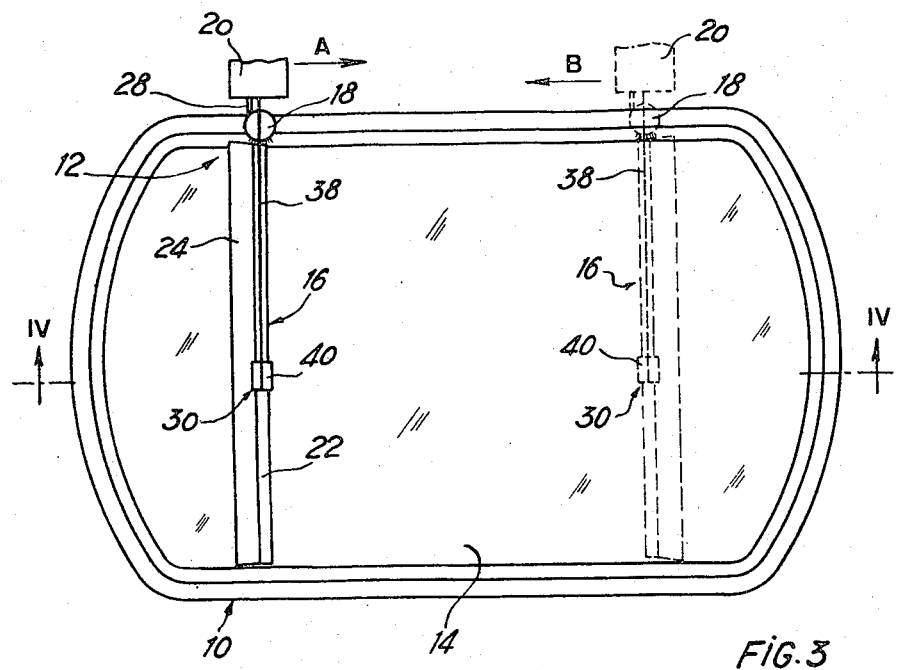
FIG. 3 is a front elevation of an alternative embodiment according to the present invention.
Figure 4:
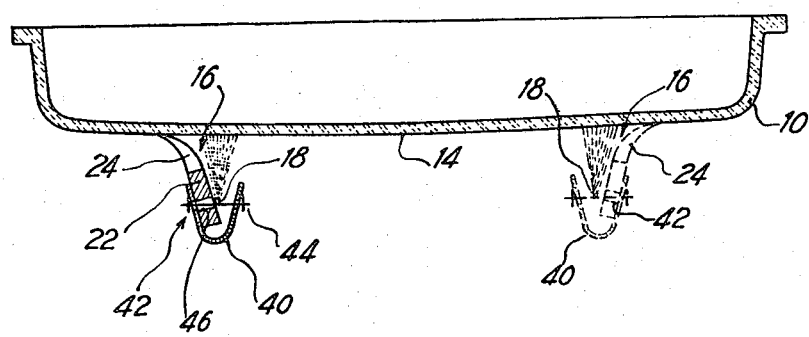
FIG. 4 is a sectional under-plan taken along the line IV—IV in FIG. 3.

In the alternative embodiment of FIGS. 3 and 4 the squeegee blade 24 extends from a fitting 22 which is located between two arms of a U section support 40 by means of a loose fixing element 42 which in this example takes the form of a spindle 44 extending through a hole 46 in the fitting 22, the diameter of the hole 46 being much larger than that of the spindle 44 so as to allow the squeegee blade 24 to tilt between the two extreme positions shown on the left and right hand sides of FIG. 4. The fitting 22 is connected direct to the drive element 20 by means of a drive rod 38 which passes directly in front of the sprinkler 18 and which in contrast to the embodiment of FIGS. 1 and 2, does not move with respect to the sprinkler 18.

With this arrangement, the wiper 16, due to friction between the squeegee blade 24 and the lens surface 14 will adopt a trailing position with respect to the sprinkler 18 in either direction of movement. Thus, as shown on the left in FIGS. 3 and 4, with movement in the direction of the arrow A, i.e., to the right in these figures, the squeegee blade will automatically assume thhe position shown in which it lies to the left of the sprinkler 18.

As soon as the direction of movement is reversed, i.e., the blade moves to the left in the direction of the arrow B in FIG. 3, the squeegee will adopt the dotted line position shown to the right of the sprinkler 18 so that in either direction of movement the sprinkler precedes the wiper blade.

What we claim as our invention and desire to ensure by Letters Patent is:

1. A cleaning device for the lens of a headlight, comprising:

a drive element reciprocable translationally in a plane parallel to the plane of the lens, a nozzle, fixed to and movable with said drive element, for spraying washing liquid on the lens, a support, a wiper carried by said support for frictional engagement with the lens, a pair of parallel links pivotally joining said support to said drive element, and abutment means defining two extreme positions of said support with respect to said drive element, said nozzle being located between said extreme positions, whereby during the initial movement of said drive element in either direction said support moves from one of its extreme positions to the other so that said wiper is arranged behind said nozzle with respect to the direction of movement of said drive element.

2. A cleaning device as defined in claim 1 wherein said drive element reciprocates along a substantially straight line.

* * * * *